United States Patent
Zhu et al.

(10) Patent No.: US 12,449,077 B1
(45) Date of Patent: Oct. 21, 2025

(54) QUICK PIPE CONNECTOR

(71) Applicants: Jianlin Zhu, Taizhou (CN); Jun Li, Taizhou (CN)

(72) Inventors: Jianlin Zhu, Taizhou (CN); Jun Li, Taizhou (CN)

(73) Assignee: TAIZHOU LIHE ECO TECH CO., LTD., Taizhou (CN)

( * ) Notice: Subject to any disclaimer, the term of this patent is extended or adjusted under 35 U.S.C. 154(b) by 0 days.

(21) Appl. No.: 18/773,619

(22) Filed: Jul. 16, 2024

(30) Foreign Application Priority Data

Jul. 2, 2024 (CN) .......................... 202421549226.2

(51) Int. Cl.
*F16L 37/091* (2006.01)
*F16L 47/06* (2006.01)

(52) U.S. Cl.
CPC .............. *F16L 37/091* (2013.01); *F16L 47/06* (2013.01)

(58) Field of Classification Search
CPC .......... F16L 37/091; F16L 47/06; F16L 47/12
USPC .................................................. 285/340, 316
See application file for complete search history.

(56) References Cited

U.S. PATENT DOCUMENTS

| | | | | |
|---|---|---|---|---|
| 7,841,630 B1 * | 11/2010 | Auray | .................... | F16L 37/091 285/151.1 |
| 10,072,783 B2 * | 9/2018 | Gledhill | ................ | F16L 37/091 |
| 11,525,534 B2 * | 12/2022 | Kluss | ................. | F16L 37/0915 |
| 11,802,643 B2 * | 10/2023 | Kluss | ................... | F16L 37/091 |
| 2006/0244258 A1 * | 11/2006 | Baumgartner | ........ | F16L 37/091 285/319 |
| 2008/0309081 A1 | 12/2008 | De Wilde | | |
| 2011/0309611 A1 * | 12/2011 | Smith | ................... | F16L 37/091 285/139.3 |
| 2015/0159792 A1 * | 6/2015 | Bobo | ................... | F16L 37/091 285/308 |
| 2020/0347976 A1 * | 11/2020 | Guest | .................... | F16L 37/091 |
| 2021/0003239 A1 | 1/2021 | Liang | | |
| 2021/0033233 A1 * | 2/2021 | Kwak | .................. | F16L 37/091 |
| 2021/0324986 A1 * | 10/2021 | Simon | ................... | F16L 37/091 |

FOREIGN PATENT DOCUMENTS

| | | |
|---|---|---|
| CN | 105020521 A | 11/2015 |
| CN | 210372464 U | 4/2020 |
| CN | 217356030 U | 9/2022 |
| CN | 220688284 U | 3/2024 |

\* cited by examiner

*Primary Examiner* — David Bochna
(74) *Attorney, Agent, or Firm* — Minder Law Group; Willy H. Wong

(57) ABSTRACT

A quick pipe connector includes a pipe-shaped body, wherein a grip ring and a locking sleeve are arranged in the body; the end of the body is provided with a connecting section corresponding to the locking sleeve; the outer side face of the locking sleeve is provided with a protruding snap ring; the body is made of plastic; the locking sleeve is made of a metallic material; the outer side face of the connecting section is provided with a through hole and corresponding to the snap ring in axial position; the snap ring is in interference fit with the connecting section; a part of the snap ring abuts against the inner side face of the connecting section, so that the pipe wall of the connecting section at that location is deformed and forms a deformation groove; the other part of the snap ring is embedded into the through hole.

8 Claims, 9 Drawing Sheets

QUICK PIPE CONNECTOR

RELATED APPLICATIONS

This application claims priority to Chinese Patent Application Number 202421549226.2 filed Jul. 2, 2024.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

TECHNICAL FIELD

The present disclosure belongs to the technical field of pipe fittings, and relates to a quick pipe connector.

BACKGROUND

When pipes such as water pipes, gas pipes, and oil pipes are connected, it is often necessary to connect two pipes by means of a pipe connector due to the limited length of the pipes. A quick pipe connector is used for the quick connection between two pipes without additional installation tools.

For example, a quick pipe connector [publication No.: CN 210372464 U or US2021003239A1] disclosed in patent literature includes a body, wherein a sealing ring, a retaining ring, a grip ring with clamping teeth, a locking sleeve and a socket are sequentially arranged in the body in the axial direction, and the grip ring is axially fixed between the locking sleeve and the retaining ring. When connection is required, a pipe is inserted into the body and props open the clamping teeth of the grip ring, and the clamping teeth are fastened to the pipe by their own elastic force after the pipe is inserted, so that the pipe can be fixed. When disassembly is required, the socket is pressed inward and the inner end of the socket props open the clamping teeth to release the pipe, so that the pipe can be easily pulled out.

In the quick pipe connector described above, the locking sleeve has two fixing structures: the first fixing structure is that an annular groove is arranged on the hole wall face of the inner hole of the body, and an annular tongue is arranged on the outer side face of the locking sleeve, and is embedded into the annular groove; a second fixing structure is that a plurality of arc-shaped grooves are arranged on the hole wall face of the inner hole of the body, and a plurality of arc-shaped tongues are arranged on the outer side face of the locking sleeve, and are correspondingly embedded into the arc-shaped grooves. In the two fixing structures, since the annular groove and the arc-shaped grooves are both concavely arranged on the hole wall face of the inner hole of the body, they often cannot be forged or injection molded due to difficulty in demolding. Therefore, in the process of machining the body, it is generally necessary to machine the annular groove or the arc-shaped grooves in a lathe or a milling machine, which leads to high machining cost. In addition to forming the grooves in the inner hole by cutting with the lathe or the milling machine, the grooves can also be formed by port riveting and diameter reduction, such as the patent document with publication number of US2012074695A1. However, this molding method needs riveting press and riveting process, so the cost reduction is not significant.

SUMMARY

The object of the present disclosure is to provide a quick pipe connector aiming at the above problems of the prior art, and solves the technical problem of how to achieve fixing of a locking sleeve at low cost.

The object of one embodiment of the present disclosure can be achieved by the following technical solutions:

a quick pipe connector includes a pipe-shaped body, wherein a grip ring and a locking sleeve for axially positioning the grip ring are arranged in the body; the end of the body is provided with a connecting section corresponding to the locking sleeve; the outer side face of the locking sleeve is provided with a protruding snap ring; the body is made of plastic; the locking sleeve is made of a metallic material; the outer side face of the connecting section is provided with at least one through hole running through a pipe wall of the connecting section and corresponding to the snap ring in axial position; the snap ring is in interference fit with the connecting section; the snap ring abuts against the inner side face of the connecting section, so that the pipe wall of the connecting section at a location corresponding to the snap ring is deformed and forms a deformation groove; and at least one first section of the snap ring is embedded into the deformation groove, at least one second section of the snap ring is embedded into the at least one through hole.

Since the plastic has certain elasticity and the rigidity of the plastic is lower than that of the metallic material, when the locking sleeve made of the metallic material is fitted into the body made of plastic and the snap ring forms an interference fit with the connecting section, the locking sleeve is not deformed while the pipe wall of the connecting section of the body is deformed. Also since the through hole runs through the pipe wall of the connecting section, the pipe wall of the connecting section is interrupted in the circumferential direction by the through hole; the through hole corresponds to the snap ring in axial position, and the snap ring is in interference fit with the connecting section. In such a way, only the inner side face of the connecting section abutting against the snap ring is deformed outward by the force of the snap ring, and the through hole does not abut against the snap ring due to no pipe wall, so that the through hole does not be deformed outward, and, since the snap ring is in interference fit with the connecting section, the part of the snap ring opposite to the through hole is naturally embedded into the through hole. Therefore, the through hole runs through the pipe wall of the connecting section to interrupt the circumferential pipe wall of the connecting section where the through hole is located, and the snap ring of the locking sleeve is in interference fit with the circumferential pipe wall of the connecting section where the through hole is located. Not only can the locking sleeve be fixed into the body by the deformation groove formed by the interference fit of the snap ring with the connecting section, but also part of the snap ring is embedded into the through hole for axial positioning, thereby improving the fixing effect. At the same time, the through hole also plays a role in releasing stress, which prevents excessive deformation stress caused by interference fitting of the connecting section with the locking sleeve, avoids cracking caused by the excessive deformation stress of the body, and stabilizes the structure of the quick pipe connector.

Moreover, since the body is made of plastic, the body can be formed by injection molding. The through hole is arranged in the outer side face of the connecting section, i.e., the outer side face of the body, thus facilitating demolding. In this way, the body with the through hole can be directly formed by injection molding at one time without cutting processing. Compared with the prior art, the processing technology is simplified, the processing cost caused by the cutting processing and the material structure being damaged caused by the cutting processing are reduced, so that the structure of the body is stable. Meanwhile, the arranged through hole can reduce a part of material consumption, and the raw material cost can be reduced in mass production.

In summary, the quick pipe connector enables the locking sleeve to be fixed to and stably fixed to the body, and also simplifies the machining process to reduce the cost. That is, compared with the prior art, the quick pipe connector realizes the fixing of the locking sleeve at lower cost; in addition, the structural stability of the body can be ensured.

In one embodiment of the quick pipe connector described above, there are a plurality of the at least one through holes that are arranged separately in a circumferential direction of the body and located at the same axial position of the body, and the snap ring is of a closed-ring structure.

The plurality of through holes are arranged, so that better use can be made of the through holes for releasing deformation stress, so that the structure of the quick pipe connector is stable; moreover, different circumferential positions of the snap ring can be embedded into the through holes, so that the locking sleeve is further stably fixed into the body; in addition, the material consumption can be further reduced, and the raw material cost can be reduced. The snap ring is of the closed-ring structure, so that not only is the structure of the snap ring stable, but also it is ensured that the snap ring is embedded into all the through holes. In addition, it is not necessary to circumferentially position the locking sleeve when the locking sleeve is press-fitted into the body, thus the operation steps of the processing technology are reduced, the press-fitting of the locking sleeve is facilitated, and the cost is reduced.

In one embodiment of the quick pipe connector described above, the at least one through hole is perpendicular to the axis of the body and is arranged in a manner of directly facing the axis of the body or being offset from the axis of the body.

The through holes being perpendicular to the axis of the body facilitate demolding during injection molding of the body. When there are the plurality of through holes, all the through holes are formed in the same direction; when there are two through holes, the two through holes can be symmetrical and are both arranged in a manner of directly facing the axis of the body; when there are three or more through holes, some or all of the through holes can be arranged in a manner of being offset from the axis of the body.

In one embodiment of the quick pipe connector described above, a protruding convex ring is arranged on the outer side face of the connecting section and located between the at least one through hole and a port of the connecting section, and the hole wall face of the at least one through hole at a side close to the convex ring is flush with the end face of the convex ring facing the through hole.

The arranged convex ring can improve the structural strength between the through hole in the connecting section and the port of the connecting section; the hole wall face of the through hole at the side close to the convex ring is flush with the end face of the convex ring facing the through hole, so that the circumferential pipe wall of the connecting section where the through hole is located can be deformed while improving the structural strength of the connecting section as much as possible to stabilize the structure of the body. In addition, the arranged convex ring provides a point of force for disassembly/assembly of the quick pipe connector from/to the pipe to facilitate disassembly/assembly of the quick pipe connector from/to the pipe. Moreover, the convex ring is arranged on the outer side face of the body, so that demolding is facilitated.

In one embodiment of the quick pipe connector described above, the inner side face of the connecting section and the outer side face of the locking sleeve are both cylindrical faces, and a gap is arranged between the outer side face of the locking sleeve and the inner side face of the connecting section. On the one hand, the arranged gap can reduce the contact between the locking sleeve and the body, thereby decreasing the pressure required for press-fitting, and reducing energy consumption, leading to cost reduction. On the other hand, the arranged gap can provide space for the pipe wall near the through hole to shrink inward, thus facilitating the release of the deformation stress.

In one embodiment of the quick pipe connector described above, the cross section of the snap ring is triangular, the face of the snap ring facing away from the grip ring is perpendicular to the outer side face of the locking sleeve, and the face of the snap ring facing the grip ring is obliquely arranged. This allows the snap ring to form a barbed structure to facilitate pressing of the locking sleeve into the body while allowing the snap ring to form a stable snap-fit structure with the connecting section to stably fix the locking sleeve into the body.

In one embodiment of the quick pipe connector described above, the interference between the snap ring and the connecting section is 0.2 mm-0.3 mm. This allows the press-fitting of the locking sleeve to be facilitated and the locking sleeve to be stably fixed into the body.

In one embodiment of the quick pipe connector described above, the outer end face of the locking sleeve is flush with the end face of the body. The end face of the body can be used as a reference face during press-fitting of the locking sleeve to facilitate axial positioning of the locking sleeve during press-fitting.

In one embodiment of the quick pipe connector described above, all the plurality of the at least one through holes account for 25%-35% of the circumference of the body. This does not result in excessive deformation stress, but also allows the locking sleeve to be stably fixed to the body.

Compared with the prior art, the present disclosure has the following advantages:

the at least one through hole is arranged in the connecting section of the body; the snap ring of the locking sleeve is in interference fit with the connecting section; the snap ring abuts against the inner side face of the connecting section, so that the pipe wall of the connecting section is deformed and forms the deformation groove; at least one first section of the snap ring is embedded into the deformation groove, at least one second section of the snap ring is embedded into the through hole, and the body can be injection-molded in one time from plastic, so that fixing of the locking sleeve into the body can be achieved at low cost.

In the figures, 1, body; 1a, first shoulder; 1b, second shoulder; 1c, third shoulder; 1d, connecting section; 1e, through hole; 1f, deformation groove; 1g, convex ring; 2, sealing ring; 3, retaining ring; 4, grip ring; 5, locking sleeve; 5a, snap ring; 6, socket; and 7, gap.

DETAILED DESCRIPTION

The following are specific embodiments of the present disclosure, and the technical solutions of the present disclosure are further described with reference to the accompanying drawings, but the present disclosure is not limited to these embodiments.

Embodiment One

Figure 1:
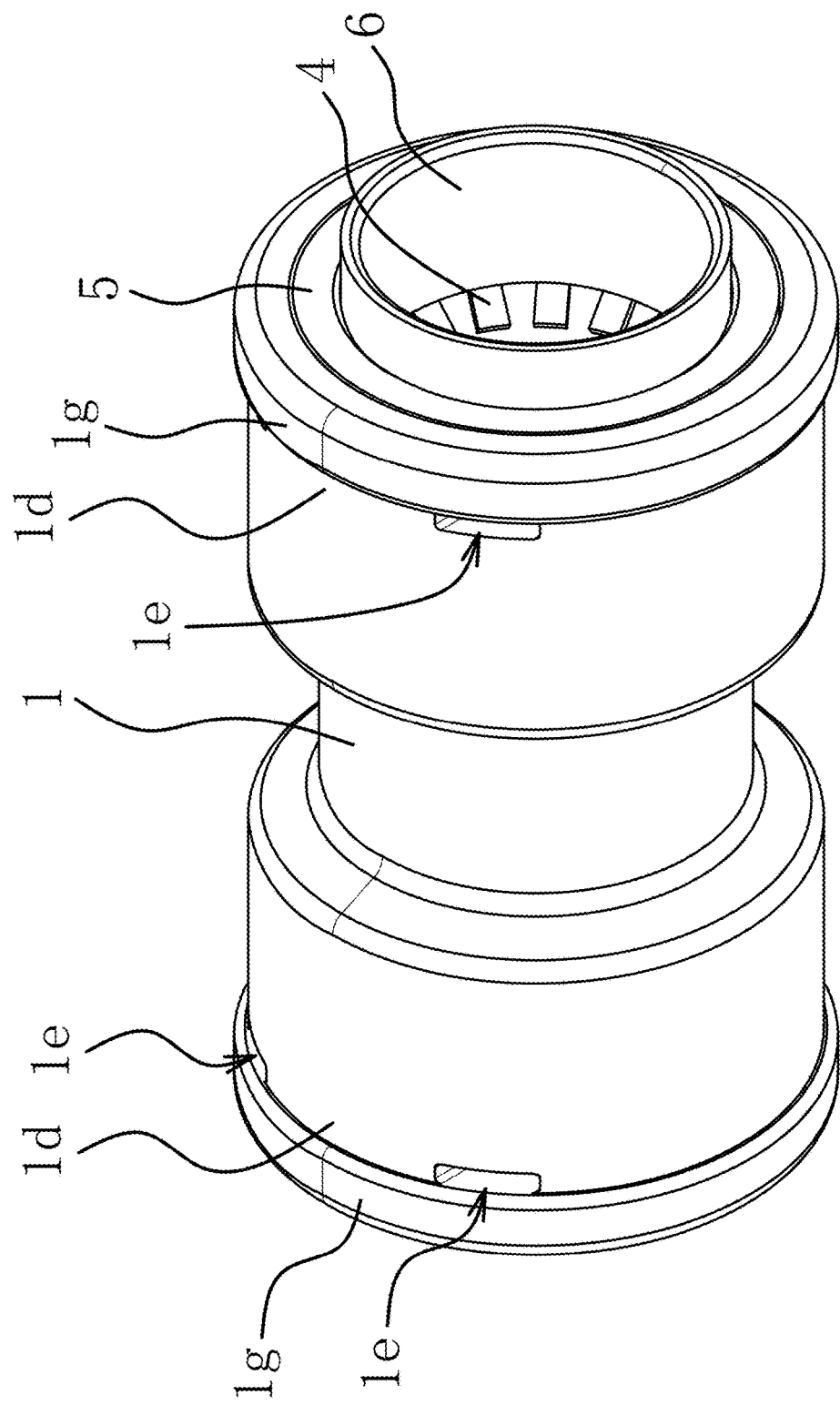
FIG. 1 is a perspective view of a quick pipe connector in Embodiment One.
Figure 2:
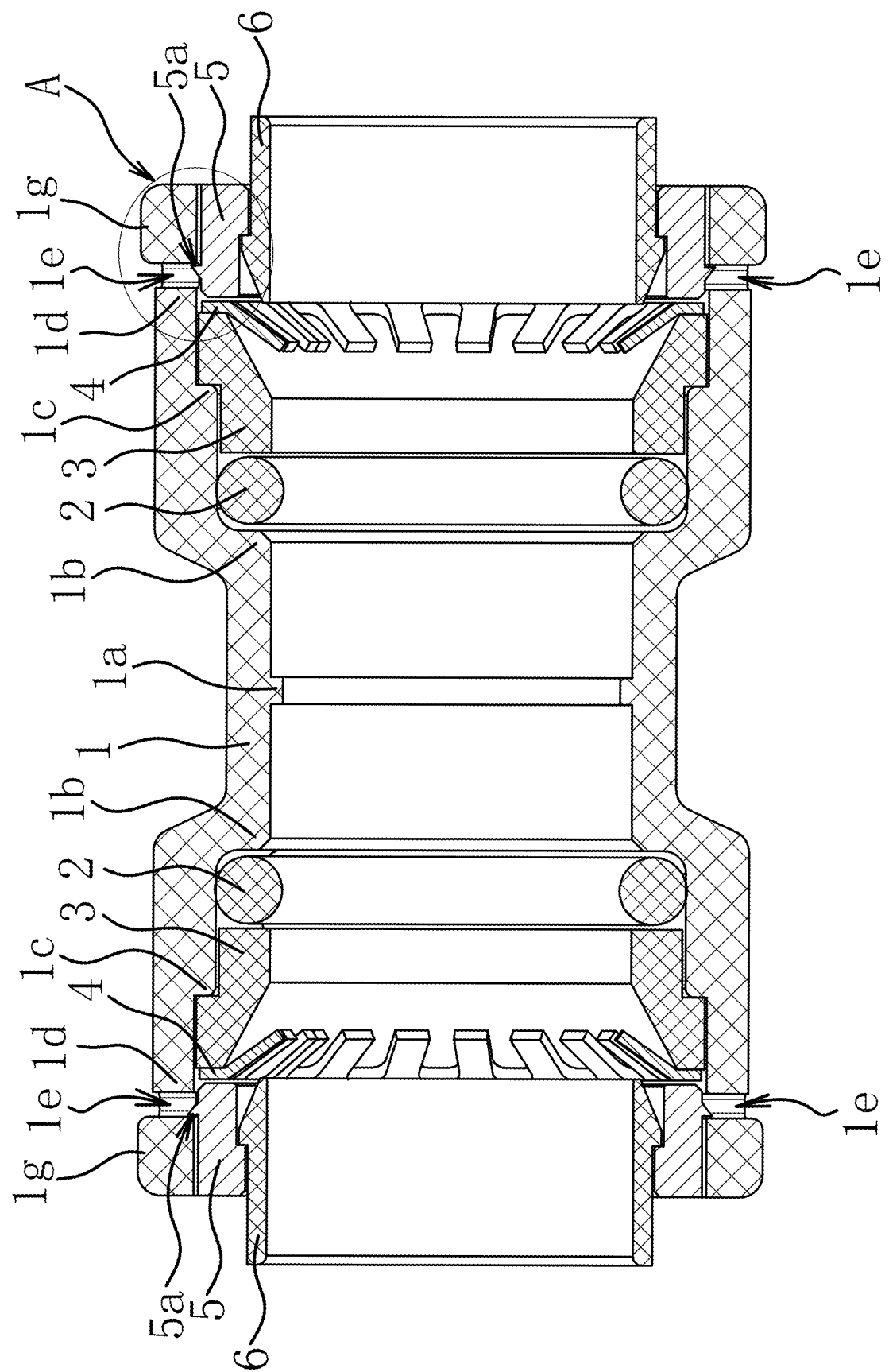
FIG. 2 is a cross-sectional view of the quick pipe connector in Embodiment One that passes through a through hole during cutting.

As shown in FIGS. 1 and 2, a quick pipe connector includes a pipe-shaped body 1. Two ends of the body 1 are each internally provided with a sealing ring 2, a retaining ring 3, a grip ring 4 with clamping teeth, and a locking sleeve 5 that are arranged in sequence from inside to outside in the axial direction; a socket 6 is inserted into the locking sleeve 5; the grip ring 4 is axially positioned between the retaining ring 3 and the locking sleeve 5. A first shoulder 1a, a second shoulder 1b and a third shoulder 1c are sequentially arranged on the inner side face of the body 1 from the middle to the two ends in the axial direction. With the first shoulder 1a, the second shoulder 1b and the third shoulder 1c being arranged in sequence, the hole diameter of the inner hole of the body 1 increases from the middle to the two ends in the axial direction. The first shoulder 1a is used to abut against a pipe inserted into the body 1 to axially position the pipe. The outer side face of the retaining ring 3 is provided with a shoulder; the retaining ring 3 is inserted into the body 1; the shoulder abuts against the third shoulder 1c; the sealing ring 2 is axially limited between the second shoulder 1b and the retaining ring 3. The structures of the two ends of the body 1 are the same, as are the structures of the sealing rings 2, the retaining rings 3, the grip rings 4, the locking sleeves 5 and the sockets 6 within the two ends of the body 1.

Figure 4:
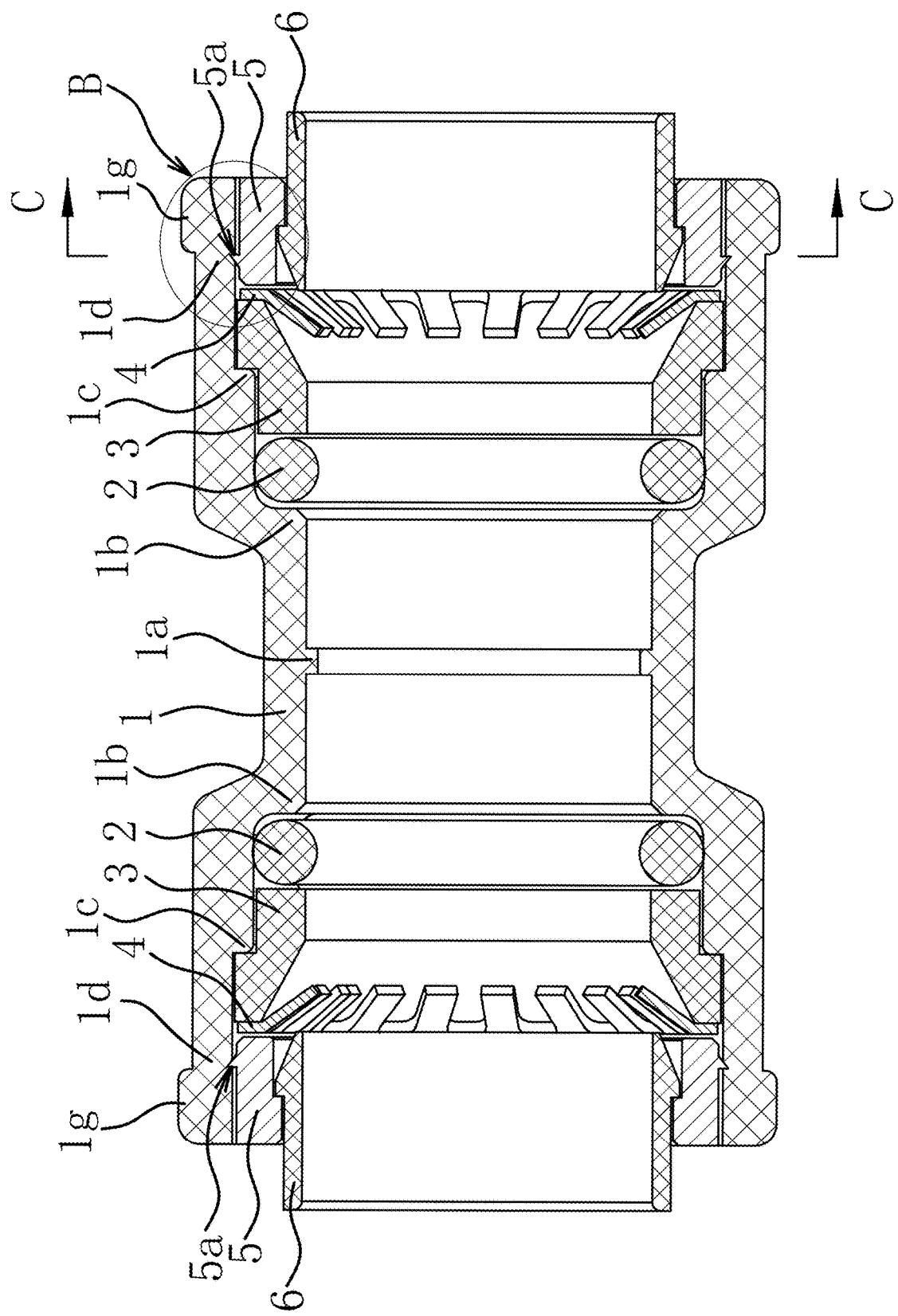
FIG. 4 is a cross-sectional view of the quick pipe connector in Embodiment One that does not pass through a through hole during cutting.

As shown in FIGS. 2 and 4, the end of the body 1 is provided with a connecting section 1d corresponding to the locking sleeve 5 on the outer side of the third shoulder 1c; the outer side face of the locking sleeve 5 is provided with a protruding snap ring 5a. The body 1 is made of plastic, such as PPSU material or PC material. The locking sleeve 5 is made of a metallic material, such as copper alloy or stainless steel. The outer side face of the connecting section 1d is provided with four through holes 1e running through the pipe wall of the connecting section 1d; the axial position of the through holes 1e on the body 1 corresponds to the snap ring 5a. A protruding convex ring 1g is arranged on the outer side face of the connecting section 1d and located between the through holes 1e and the port of the connecting section 1d; the hole wall faces of the through holes 1e on the side close to the convex ring 1g are flush with the end face of the convex ring 1g facing the through holes 1e. The outer end face of the locking sleeve 5 is flush with the end face of the body 1.

Figure 3:
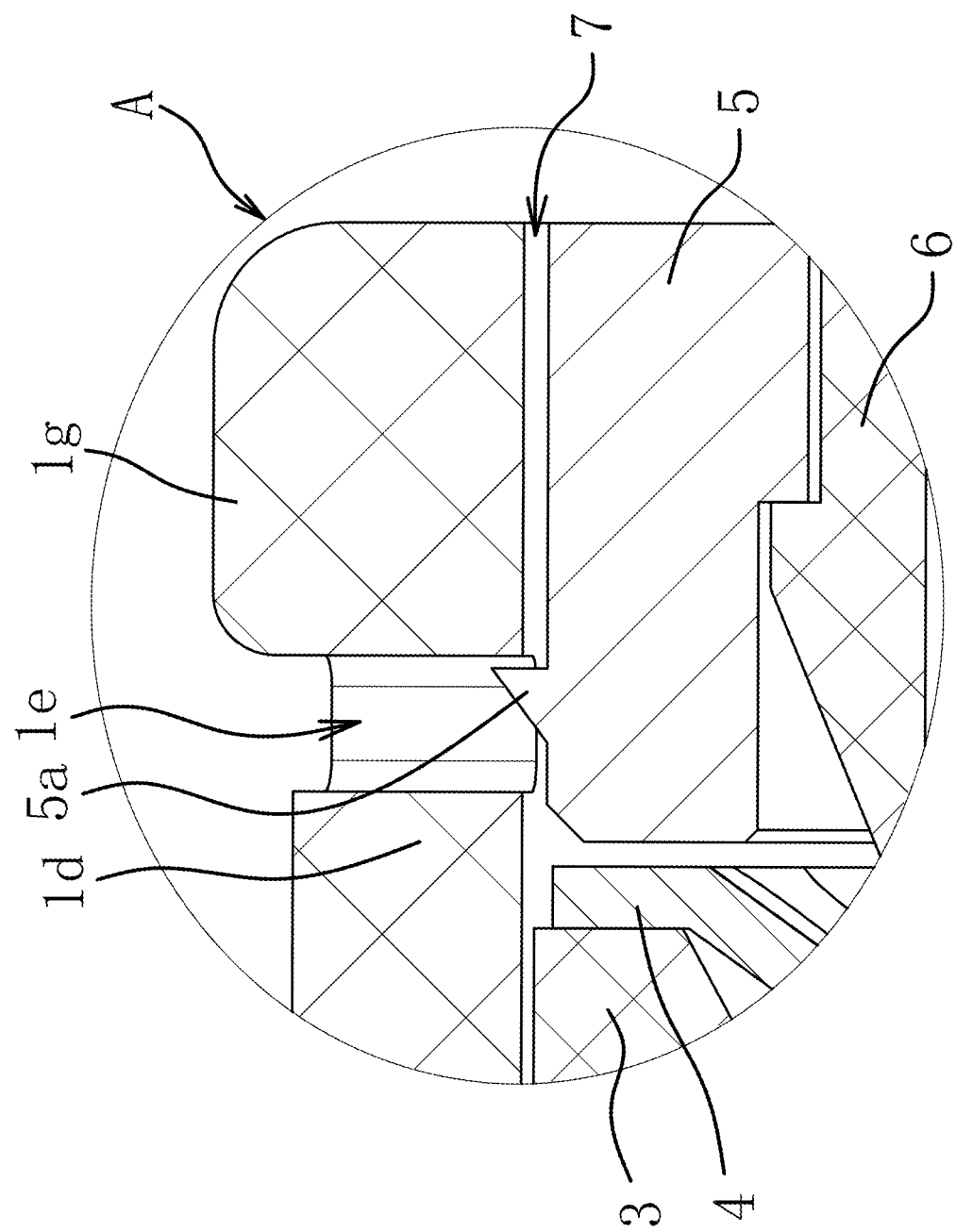
FIG. 3 is an enlarged view of A in FIG. 2.
Figure 5:
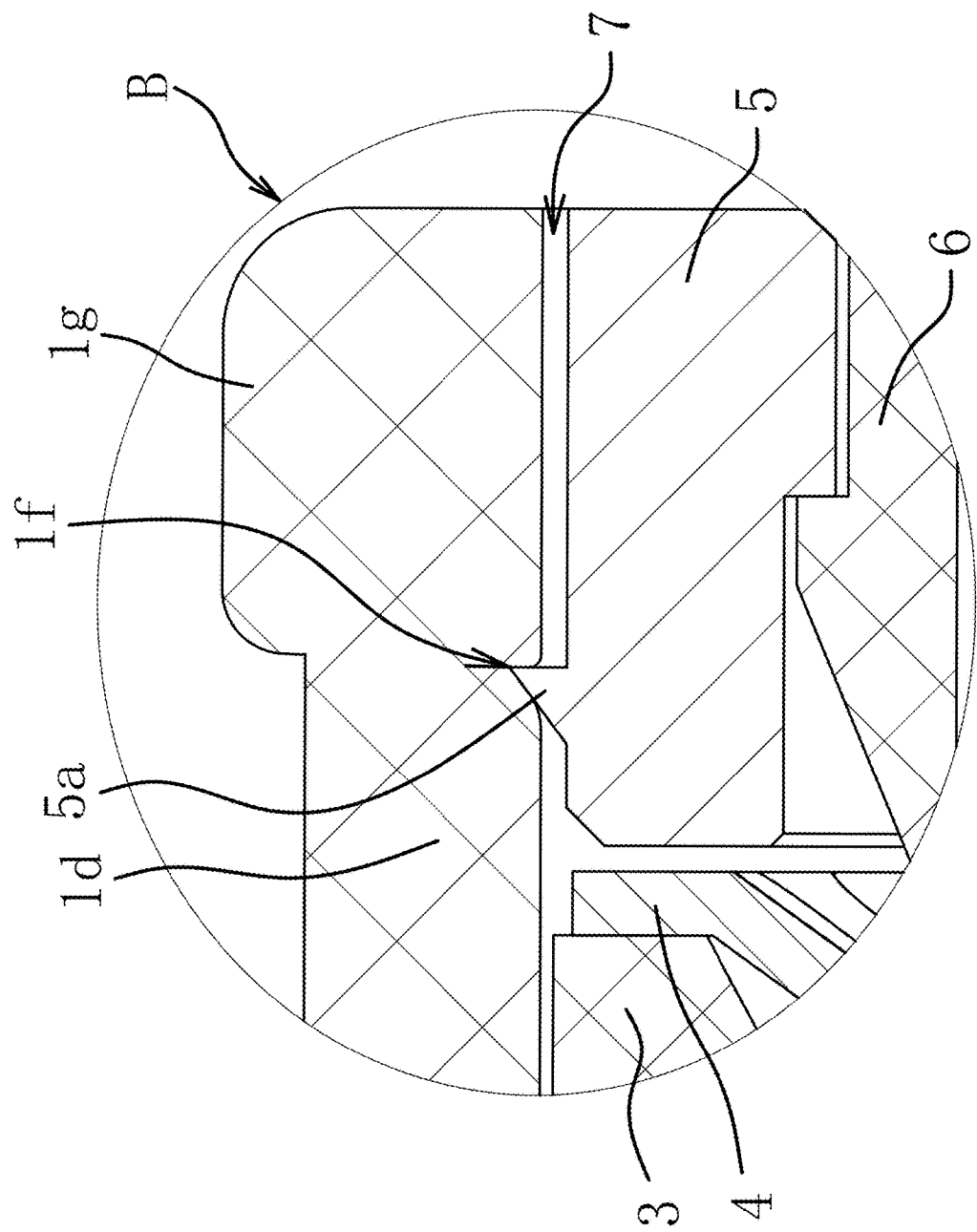
FIG. 5 is an enlarged view of B in FIG. 4.
Figure 6:
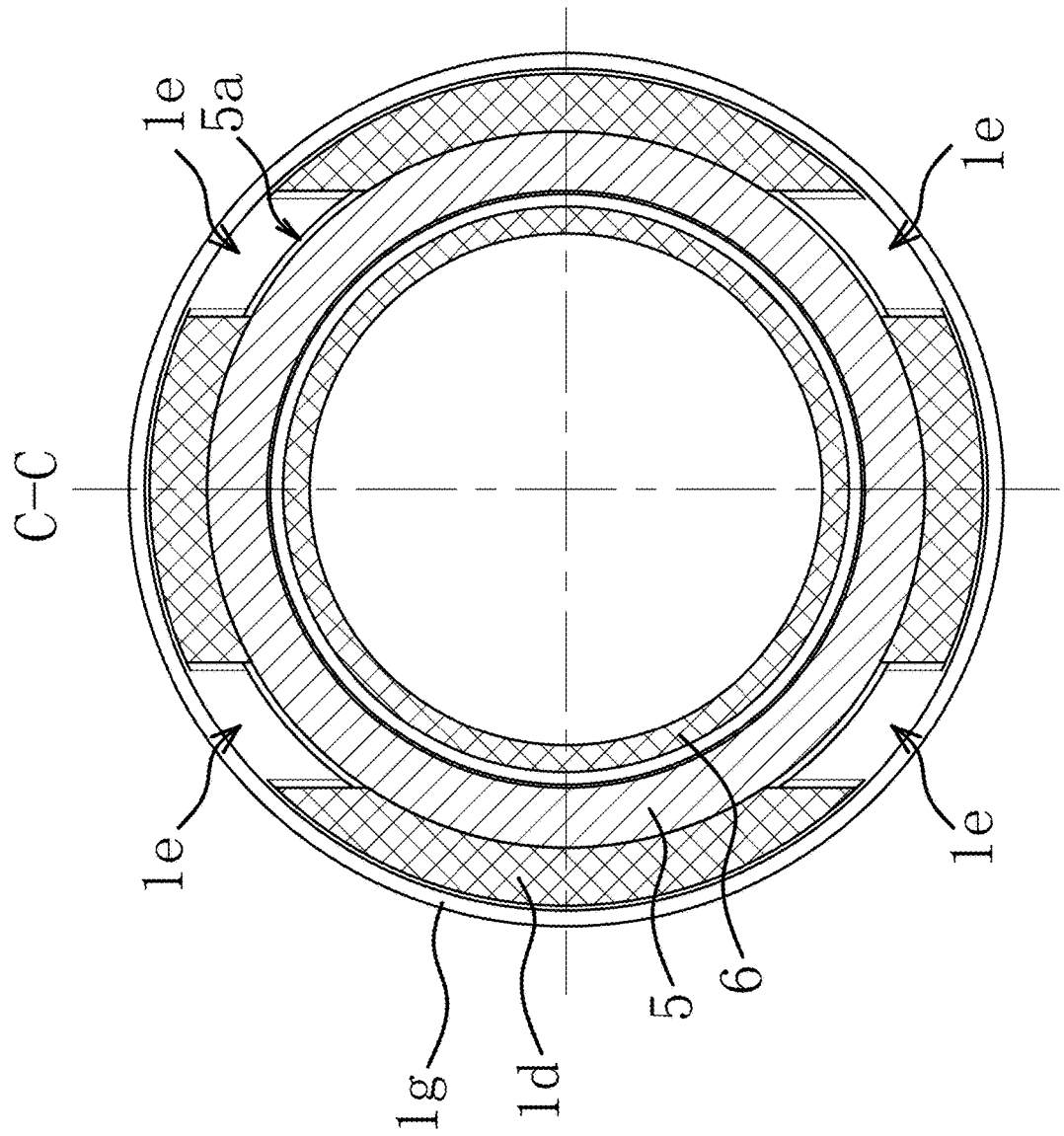
FIG. 6 is a cross-sectional view taken along the direction C-C in FIG. 4.
Figure 8:
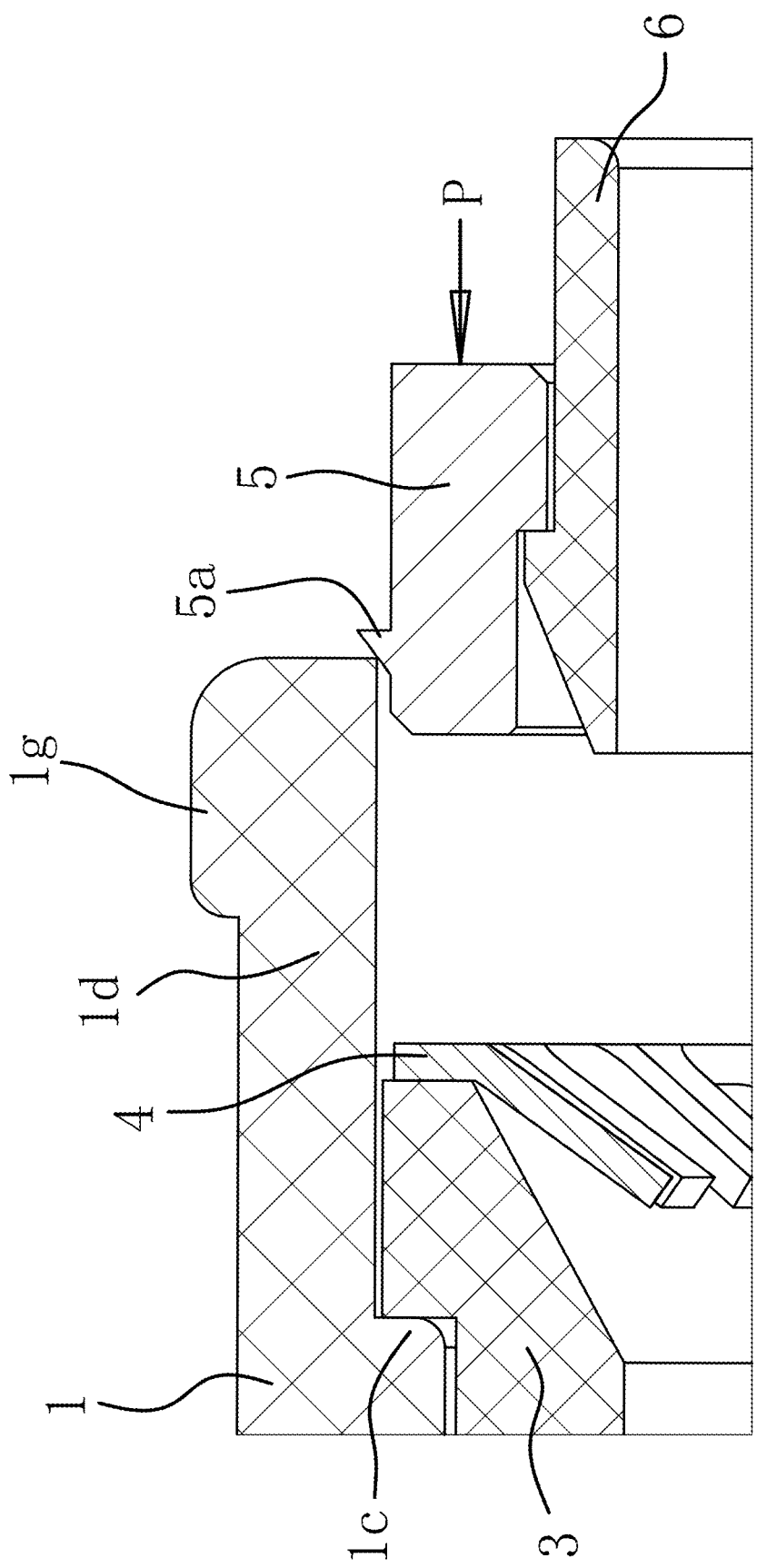
FIG. 8 is a schematic diagram of press-fitting of a locking sleeve of the quick pipe connector in Embodiment One.

As shown in conjunction with FIGS. 3, 5 and 8, the snap ring 5a is in interference fit with the connecting section 1d. The snap ring 5a abuts against the inner side face of the connecting section 1d, so that the pipe wall of the connecting section 1d at that location corresponding to the snap ring 5a is deformed and forms a deformation groove 1f. Parts of the snap ring 5a are embedded into the deformation groove 1f, and the other parts of the snap ring 5a are embedded into the through holes 1e. The inner side face of the connecting section 1d and the outer side face of the locking sleeve 5 are both cylindrical faces, and there is a gap 7 between the outer side face of the locking sleeve 5 and the inner side face of the connecting section 1d. The gap 7 is 0.2 mm-0.3 mm, such as 0.2 mm, 0.25 mm, and 0.3 mm. The cross section of the snap ring 5a is triangular, that is, the snap ring 5a is triangular on the longitudinal section of one side of the locking sleeve 5; the face of the snap ring 5a facing away from the grip ring 4 is a limiting face, which is perpendicular to the outer side face of the locking sleeve 5; the face of the snap ring 5a facing the grip ring 4 is a guide face, which is obliquely arranged. The outer diameter of the snap ring 5a is greater than the hole diameter of the connecting section 1d; the interference between the snap ring 5a and the connecting section 1d is 0.2 mm-0.3 mm. The interference between the snap ring 5a and the connecting section 1d refers to half of the difference between the maximum outer diameter of the snap ring 5a and the hole diameter of the connecting section 1d. For example, the interference between the snap ring 5a and the connecting section 1d is 0.2 mm, 0.25 mm, and 0.3 mm. The inclination angle of the guide face is 30°-45°, and the inclination angle of the guide face refers to the included angle between the guide face and the axis of the locking sleeve 5. For example, the inclination angles of the guide face are 30°, 35°, 40°, 45°, etc. As shown in FIG. 6, the four through holes 1e are separately arranged in the circumferential direction of the body 1 and at the same axial position of the body 1; the snap ring 5a is of a closed-ring structure. The through holes 1e are perpendicular to the axis of the body 1 and are arranged in a manner of being offset from the axis of the body 1; the forming directions of the four through holes 1e are the same. All the through holes 1e account for 25%-35% of the circumference of the body 1, such as 25%, 27%, 30%, and 35%. The horizontal dash-dot line in FIG. 6 is the parting line of the body 1 during injection molding, and the through holes 1e are perpendicular to the parting line, thus facilitating demolding. The body 1 can be formed once by injection molding.

Figure 7:
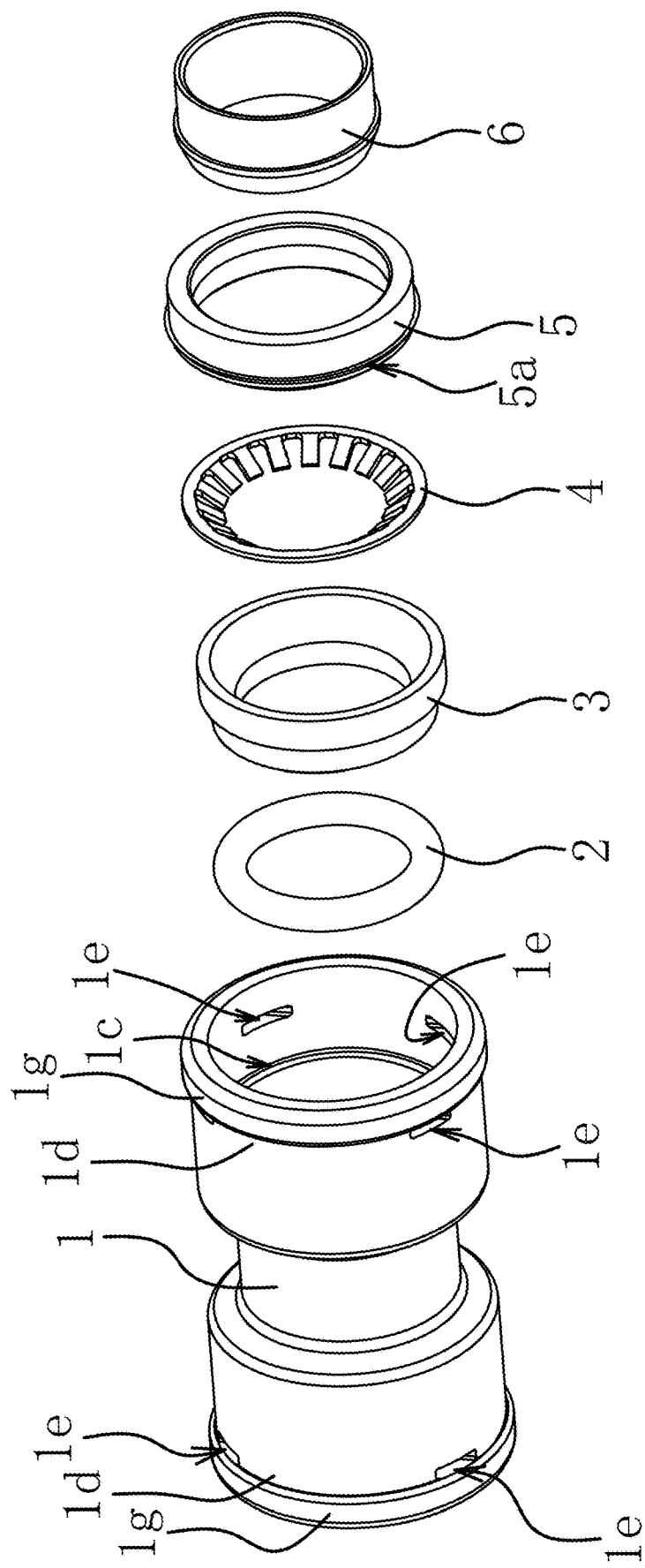
FIG. 7 is an exploded view of one end of the quick pipe connector in Embodiment One.

As shown in FIG. 2, FIG. 7 and FIG. 8, before the body 1 is assembled, the inner side face of the connecting section 1d of the body 1 is a cylindrical face without the deformation groove 1f. When assembling, the sealing ring 2 is placed into the body 1, so that the sealing ring 2 abuts against the second shoulder 1b; then the retaining ring 3 is placed into the body 1, so that the shoulder of the retaining ring 3 abuts against the third shoulder 1c; next, the grip ring 4 is placed into the body, so that the grip ring 4 abuts against the outer end face of the retaining ring 3; then the socket 6 is inserted into the locking sleeve 5; then, the locking sleeve 5 is press-fitted into the connecting section 1d, so that the out end face of the locking sleeve 5 is flush with the end face of the body 1. At this time, the snap ring 5a on the locking sleeve 5 faces the through holes 1e. Since the snap ring 5a and the connecting section 1d are in interference fit, as shown in FIGS. 5 and 6, the snap ring 5a abuts against the inner side face of the connecting section 1d, so that the pipe wall of the connecting section 1d at a location corresponding to the snap ring 5a is deformed and forms the deformation groove 1f which is discontinuous due to the through holes 1e. As shown in FIGS. 3 and 6, four first section of the snap ring 5a are embedded into the deformation groove 1f, four second section of the snap ring 5a are embedded into the four through holes 1e respectively, so that the locking sleeve 5 is stably fixed into the body 1. After one end of the body 1 is assembled, the body 1 is overturned such that the other end of the body 1 is assembled, thus completing the assembly.

Embodiment Two

Figure 9:
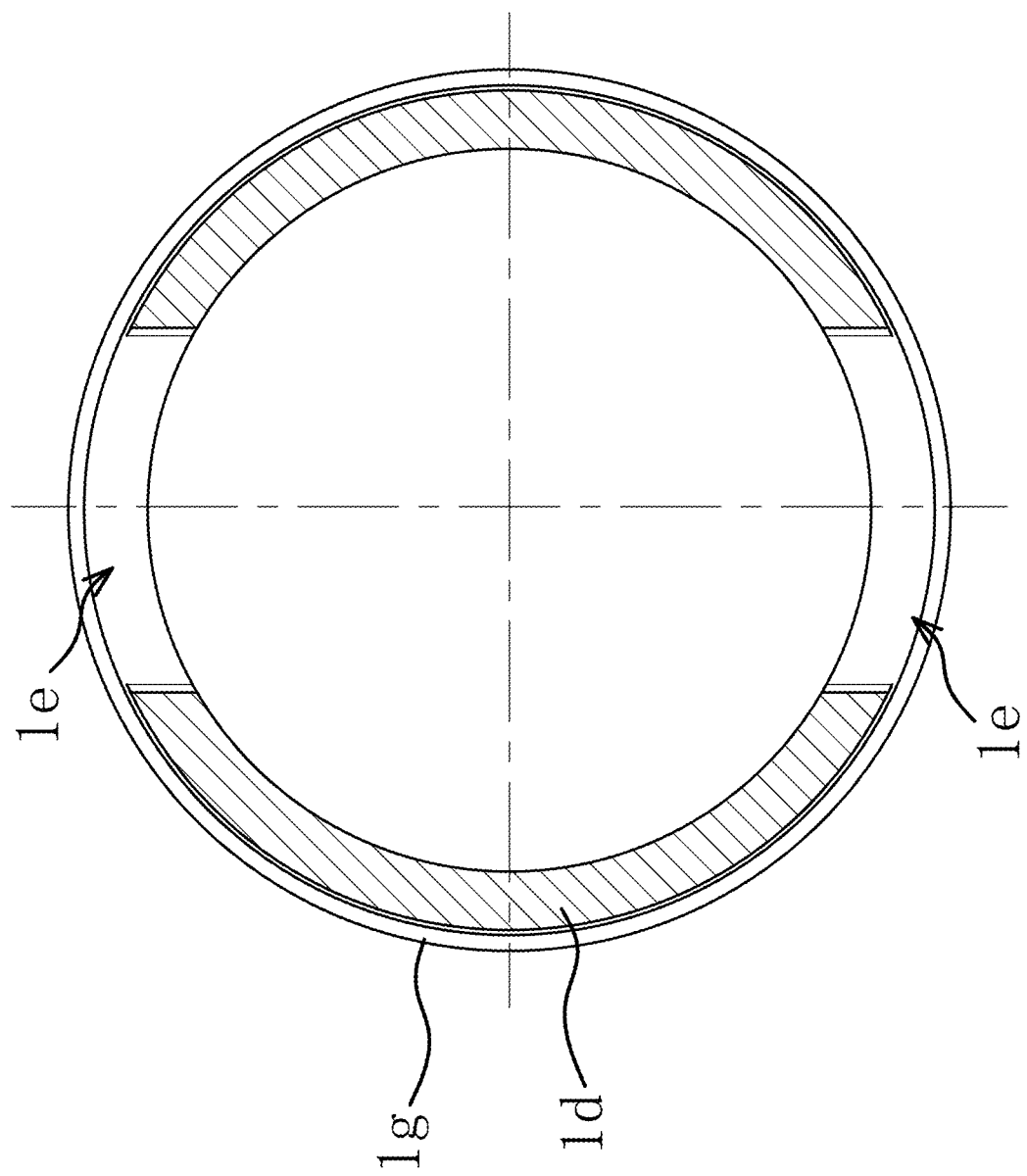
FIG. 9 is a cross section of a body of the quick pipe connector in Embodiment Two at the through hole.

As shown in FIG. 9, the body 1 is provided with two through holes 1e. The two through holes 1e are arranged in the radial direction of the body 1 and in a manner of directly facing the axis of the body 1. The two through holes 1e are symmetrical. The horizontal dash-dot line in FIG. 9 shows the parting line of the body 1 during injection molding. Other structures are the same as Embodiment One.

Embodiment Three

The body 1 is provided with one through hole 1e. The one through hole 1e is arranged in the radial direction of the body 1. Other structures are the same as Embodiment One.

The specific embodiments described herein are merely illustrative of the spirit of the present disclosure. Those skilled in the art to which the present disclosure pertains may make various modifications or additions to or similar substitution for the specific embodiments described without departing from the spirit of the present disclosure or departing from the scope thereof as defined by the appended claims.

The invention claimed is:

1. A quick pipe connector, comprising a pipe-shaped body (1), wherein a grip ring (4) and a locking sleeve (5) for axially positioning the grip ring (4) are arranged in the body (1); an end of the body (1) is provided with a connecting section (1d) corresponding to the locking sleeve (5); an outer side face of the locking sleeve (5) is provided with a protruding snap ring (5a); the body (1) is made of plastic; the locking sleeve (5) is made of a metallic material; an outer side face of the connecting section (1d) is provided with at least one through hole (1e) running through a pipe wall of the connecting section (1d) and corresponding to the snap ring (5a) in axial position; the snap ring (5a) is in interference fit with the connecting section (1d); the snap ring (5a) abuts against an inner side face of the connecting section (1d), so that the pipe wall of the connecting section (1d) at a location corresponding to the snap ring (5a) is deformed and forms a deformation groove (1f); and at least one first section of the snap ring (5a) is embedded into the deformation groove (1f), at least one second section of the snap ring (5a) is embedded into the at least one through hole (1e); and wherein a protruding convex ring (1g) is arranged on the outer side face of the connecting section (1d) and located between the at least one through hole (1e) and a port of the connecting section (1d), and a hole wall face of the at least one through hole (1e) at a side close to the convex ring (1g) is flush with an end face of the convex ring (1g) facing the at least one through hole (1e).

2. The quick pipe connector according to claim 1, wherein there are a plurality of the at least one through holes (1e) that are arranged separately in a circumferential direction of the body (1) and located at a same axial position of the body (1); the snap ring (5a) is of a closed-ring structure.

3. The quick pipe connector according to claim 2, wherein the plurality of the at least one through holes (1e) are perpendicular to an axis of the body (1) and are arranged in a manner of directly facing the axis of the body (1) or being offset from the axis of the body (1).

4. The quick pipe connector according to claim 2, wherein all the plurality of the at least one through holes (1e) account for 25%-35% of a circumference of the body (1).

5. The quick pipe connector according to claim 1, wherein the inner side face of the connecting section (1d) and the outer side face of the locking sleeve (5) are both cylindrical faces, and a gap (7) is arranged between the outer side face of the locking sleeve (5) and the inner side face of the connecting section (1d).

6. The quick pipe connector according to claim 1, wherein a cross section of the snap ring (5a) is triangular; a face of the snap ring (5a) facing away from the grip ring (4) is perpendicular to the outer side face of the locking sleeve (5); a face of the snap ring (5a) facing the grip ring (4) is obliquely arranged.

7. The quick pipe connector according to claim 1, wherein an interference between the snap ring (5a) and the connecting section (1d) is 0.2 mm-0.3 mm.

8. The quick pipe connector according to claim 1, wherein an outer end face of the locking sleeve (5) is flush with an end face of the body (1).

* * * * *